(12) United States Patent
Wolcott et al.

(10) Patent No.: US 7,236,517 B2
(45) Date of Patent: Jun. 26, 2007

(54) METHOD FOR DETERMINING THE SPREADING SEQUENCE OF A SPREAD SPECTRUM SIGNAL

(75) Inventors: Theodore J. Wolcott, Palo Alto, CA (US); Robert A. Wright, Sandy, UT (US)

(73) Assignee: L3 Communications Corp., New York, NY (US)

( * ) Notice: Subject to any disclaimer, the term of this patent is extended or adjusted under 35 U.S.C. 154(b) by 799 days.

(21) Appl. No.: 10/440,676

(22) Filed: May 19, 2003

(65) Prior Publication Data

US 2004/0233978 A1 Nov. 25, 2004

(51) Int. Cl.
*H04B 1/00* (2006.01)

(52) U.S. Cl. .................................. 375/150; 375/343

(58) Field of Classification Search .............. 375/147, 375/150, 142, 152, 316, 340, 342–343; 370/335, 370/342, 331; 455/436, 439, 442
See application file for complete search history.

(56) References Cited

U.S. PATENT DOCUMENTS

| | | | | |
|---|---|---|---|---|
| 6,108,324 A | * | 8/2000 | Brown et al. | 370/335 |
| 6,363,108 B1 | * | 3/2002 | Agrawal et al. | 375/152 |
| 6,445,728 B1 | * | 9/2002 | Byun | 375/142 |
| 6,519,298 B1 | * | 2/2003 | Kim | 375/343 |
| 6,668,012 B1 | * | 12/2003 | Hershey et al. | 375/150 |
| 6,738,438 B2 | * | 5/2004 | Rick et al. | 375/343 |

* cited by examiner

*Primary Examiner*—Khanh Tran
(74) *Attorney, Agent, or Firm*—Perman & Green, LLP

(57) ABSTRACT

A system for despreading a spread spectrum signal includes at least one receiver for capturing a plurality of snapshots of the signal and a processing device for constructing a confidence vector from at least two of the plurality of snapshots. The processing device is operable to generate a first estimated spreading sequence of the signal, and to correlate the first estimated spreading sequence and the confidence vector to generate a second spreading sequence for despreading the signal.

15 Claims, 4 Drawing Sheets

METHOD FOR DETERMINING THE SPREADING SEQUENCE OF A SPREAD SPECTRUM SIGNAL

BACKGROUND OF THE INVENTION

1. Field of the Invention

The present invention relates to signal detection and, more particularly, to detection of a spread spectrum signal and determination of its spreading sequence.

2. Brief Description of Related Developments

Wireless communications systems are commonly employed to provide voice and data communications to users. Such communications systems may use spread spectrum modulation where a data modulated carrier is modulated by a spreading sequence before being transmitted. The spreading sequence usually includes a pseudo-random number (PN) sequence occurring at a chip rate much higher than the bit rate of the data sequence being transmitted.

In a typical spread spectrum receiver, the modulated signal is typically correlated with the particular spreading sequence to produce an estimate of the transmitted data sequence. However, in order to "despread" the spread spectrum signal, the receiver must have information related to the spreading sequence used to modulate the data sequence.

It would be advantageous to be able to detect a spread spectrum signal with unknown characteristics, for example, center frequency, chip rate, spreading sequence, etc., and to identify the spreading sequence of the detected signal for determination of the signal's data sequence.

SUMMARY OF THE INVENTION

The present invention is directed to detecting a spread spectrum signal and to identifying the spreading sequence of the detected signal. In one embodiment, the present invention is directed to a method for despreading a spread spectrum signal. The method includes acquiring a plurality of snapshots of the signal, constructing a confidence vector from at least two of the plurality of snapshots, generating a first estimated spreading sequence of the signal, and correlating the first estimated spreading sequence and the confidence vector to generate a second spreading sequence for despreading the signal.

In another embodiment, the present invention is directed to a system for despreading a spread spectrum signal, including at least one receiver for capturing a plurality of snapshots of the signal and a processing device for constructing a confidence vector from at least two of the plurality of snapshots, where the processing device is operable to generate a first estimated spreading sequence of the signal, and to correlate the first estimated spreading sequence and the confidence vector to generate a second spreading sequence for despreading the signal.

In yet another embodiment, the present invention is directed to a remote terminal for despreading a spread spectrum signal. The remote terminal includes circuitry for capturing a plurality of snapshots of the signal, and a link to a local terminal having a facility to construct a confidence vector from at least two of the plurality of snapshots. The local terminal is operable to generate a first estimated spreading sequence of the signal, and to correlate the first estimated spreading sequence and the confidence vector to generate a second spreading sequence for despreading the signal.

In still another embodiment, the present invention is directed to a local terminal for despreading a spread spectrum signal. The local terminal has a link to a remote terminal for capturing a plurality of snapshots of the signal and a processing device for constructing a confidence vector from at least two of the plurality of snapshots. The processing device is operable to generate a first estimated spreading sequence of the signal, and to correlate the first estimated spreading sequence and the confidence vector to generate a second spreading sequence for despreading the signal.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(S)

Figure 1:
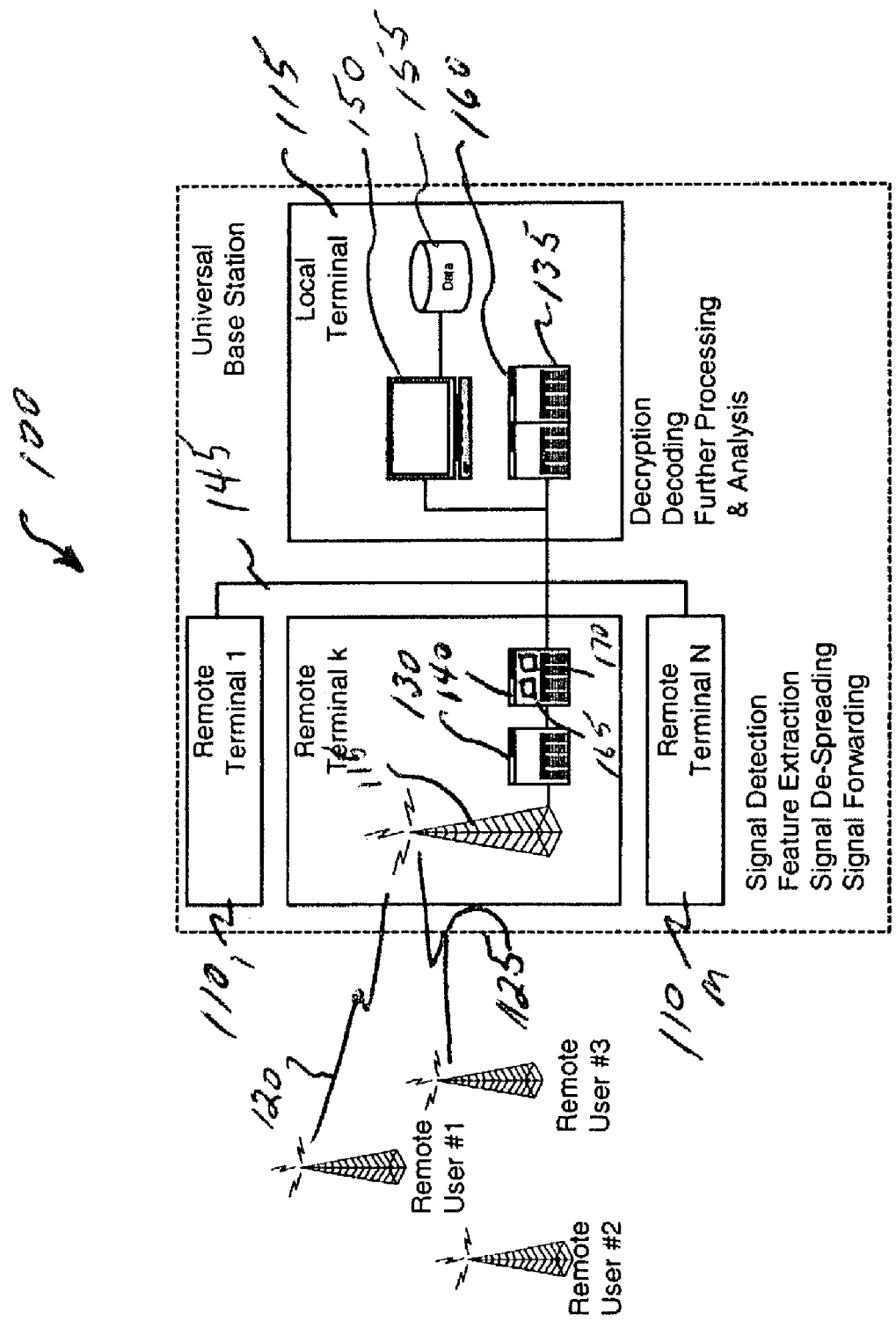
FIG. 1 shows a system for determining the spreading sequence of a spread spectrum signal according to the present invention.

Referring to FIG. 1, a system 100 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

As shown in FIG. 1, system 100, also referred to as a Universal Base Station (UBS), generally includes a detection, feature extraction, and despreading function performed by each of one or more remote terminals $110_1 \ldots 110_n$. System 100 also includes a decryption, decoding and processing function performed by local terminal 115.

The present invention includes utilizing the one or more remote terminals $110_1 \ldots 110_n$. To detect a spread spectrum signal with unknown characteristics, for example, center frequency, chip rate, spreading sequence, etc., and to acquire samples of the unknown spread spectrum signal, also referred to as received snapshots $r_1 \ldots r_M$. The present invention further includes utilizing local terminal 115 to identify the spreading sequence of the detected signal from snapshots $r_1 \ldots r_M$, and to provide the spreading sequence to the one or more remote terminals $110_1 \ldots 110_n$. Upon receiving the spreading sequence, the one or more remote terminals $110_1 \ldots 110_n$, may despread the signal to extract its data sequence.

Each of the one or more remote terminals $110_1 \ldots 110_n$ may include an antenna 115, signal processing circuitry 140, and a database 130 of signal characteristics for signal identification. Signal processing circuitry 140 may include one or more transmitters 165, receivers 170, processors, memory, and other components for performing the functions of the present invention.

The one or more remote terminals $110_1 \ldots 110_n$ are coupled to local terminal 115 through a link 145. Link 145 may include any suitable communications network, for example, the Public Switched Telephone Network (PSTN), a wireless network, a wired network, a Local Area Network (LAN), a Wide Area Network (WAN), virtual private network (VPN) etc. Remote terminals $110_1 \ldots 110_n$ and local terminal 115 may communicate bi-directionally over link 145 using any suitable protocol, or modulation standard, for example, X.25, ATM, TCP/IP, V34, V90, etc.

Local terminal 115 may include a display 150, memory 155, and a processing device 160 for performing the functions described herein. Processing device 160 may further include a linear feedback register 135 for signal processing as described in detail below.

System 100 generally detects and processes at least two types of signals, registered signals 120 and unregistered signals 125. For the purposes of this invention, registered signals 120 are spread spectrum signals whose characteristics, for example, center frequency, chip rate, spreading sequence, etc., are known by system 100, and may be de-spread upon detection by a remote terminal $110_1 \ldots 110_n$. The characteristics of registered signals may be stored in database 130. Unregistered signals 125 are spread spectrum signals which have not yet been characterized in system 100 and may require processing to determine their characteristics before despreading may be performed by a remote terminal $110_1 \ldots 110_n$.

Figure 2:
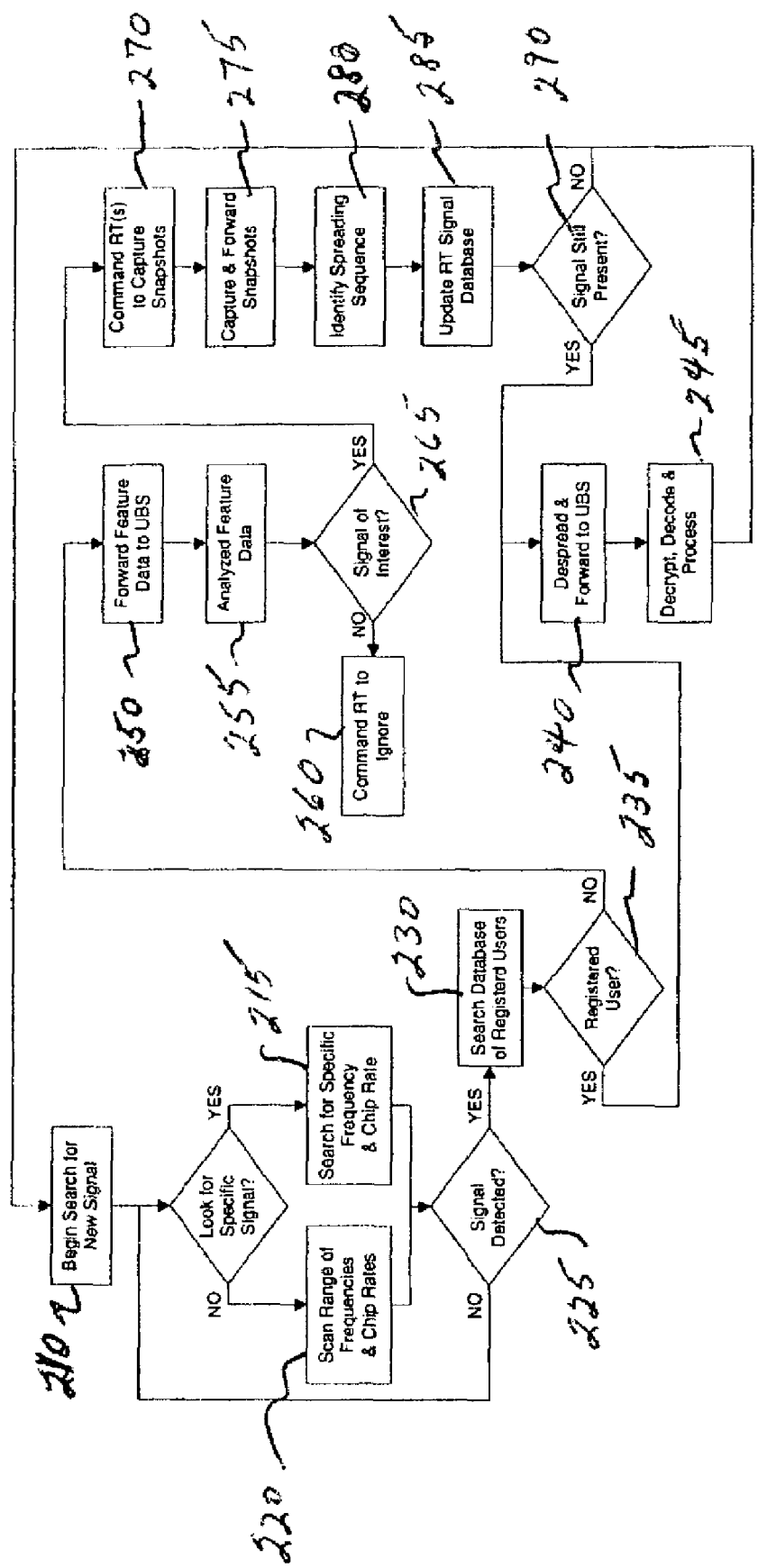
FIG. 2 shows a flow diagram of the overall operation of the system.

The operation of system 100 may be described with reference to FIG. 2. The one or more remote terminals $110_1 \ldots 110_n$ search for signals as shown in block 210. If a remote terminal $110_1 \ldots 110_n$ is searching for a particular signal (block 215), the search criteria may include a specific frequency and chip rate. If the search is not for a specific signal (block 220), remote terminal $110_1 \ldots 110_n$ may scan a range of frequencies and chip rates. If a signal is detected (block 225), the detecting remote terminal $110_1 \ldots 110_n$ may extract features from the detected signal, for example, using quadratic feature extraction or other techniques. The detecting remote terminal $110_1 \ldots 110_n$ may then search its database 130 to determine if the signal is a registered signal 125 (block 230). Upon detection of a registered signal 120 (block 235), remote terminal $110_1 \ldots 110_n$ may initiate a despreading process (block 240) to extract the data sequence of registered signal 120, including any encryption and encoding. The proper signal characteristics to be used for despreading, which may include sequence, rate, and center frequency, may be retrieved from database 130 (FIG. 1), which generally includes entries for each registered signal 120.

Once registered signal 120 has been despread, the data sequence may be relayed to local terminal 115 (block 240). The data sequence being relayed may occupy a bandwidth proportional to the data rate, as opposed to the spreading rate. Local terminal 115 may then decrypt, decode, and process the data sequence (block 245).

The operation of system 100 may be more complex when one or more remote terminals $110_1 \ldots 110_n$ detect an unregistered signal 125 (block 235). In this case, the results of the feature extraction process typically does not result in a match to any particular entry in database 130 (FIG. 1). If no match occurs, the detecting remote terminals $110_1 \ldots 110_n$ may forward feature information, such as the center frequency and chip rate, to local terminal 115 (block 250). These features may be forwarded at a reduced rate to conserve bandwidth. At local terminal 115 the signal features may be analyzed (block 255), and a decision may be made to either ignore unregistered signal 125 (block 260) or to characterize unregistered signal 125.

If unregistered signal 125 is deemed to be of interest (block 265), local terminal 115 may send commands to one or more remote terminals $110_1 \ldots 110_n$ instructing them to begin capturing snapshots $r_1 \ldots r_M$ of unregistered signal 125, specifying the center frequency, chip rate, and a start-time reference (block 270). Each snapshot $r_1 \ldots r_M$ may then be forwarded to local terminal 115 along with the corresponding timestamps (block 275), allowing the various snapshots $r_1 \ldots r_M$ to be aligned in time. Local terminal 125 may identify a spreading sequence from the snapshots $r_1 \ldots r_M$ (block 280) and convey the spreading sequence to each remote terminal $110_1 \ldots 110_n$ for entry into data base 130 (block 285).

If unregistered signal 125 is still present (block 290), the one or more remote terminals may begin de-spreading unregistered signal 125. Otherwise, because the spreading sequence is stored in database 130, it is available for despreading any future transmissions of that particular signal. As a result, unregistered signal 125 has become a registered signal 120.

The determination of the spreading sequence of unregistered signal 125 by local terminal 115 will now be described in detail. As mentioned above, once unregistered signal 125 has been deemed of interest, one or more remote terminals $110_1 \ldots 110_n$ capture snapshots $r_1 \ldots r_M$ of unregistered signal 125 and send them to local terminal 115 for determination of the spreading sequence. Certain system constraints may require sequence identification within a certain period of time, for example, 600 seconds.

Local terminal 115 is operable to identify the spreading sequence of unregistered signal 125 from snapshots $r_1 \ldots r_M$. Generally, spreading sequence identification includes capturing snapshots $r_1 \ldots r_M$, correlation of snapshots $r_1 \ldots r_M$, generating a confidence vector, generating a spreading sequence estimate, correlating the estimate with the confidence vector, repeating this process for different spreading sequence estimates, repeating this process for each snapshot $r_1 \ldots r_M$, and selecting the estimated spreading sequence with the highest average correlation.

A spread spectrum signal may be produced as follows. Let $\{d_i\}$ be the data sequence being transmitted—including any encryption, encoding, and other signal-processing performed by the user prior to transmission—at a bit rate $R_d$ and a bit period $T_d = R_d^{-1}$. Assuming the signal is spread by a direct sequence generated by a linear feedback register of length L, the spreading sequence is $\{c_k\}$ and the chip rate, $R_c >> R_d$. The chip period is $T_c = R_c^{-1}$. The spreading factor, $K = R_c/R_d$, is also the number of chips per data bit.

Figure 3:
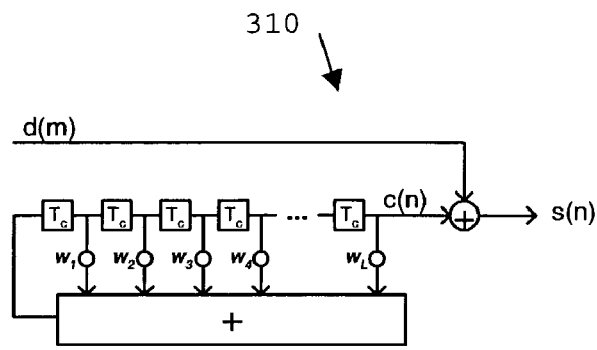
FIG. 3 shows a diagram of a linear feedback register for generating a spreading sequence.

FIG. 3 shows an illustration of the spreading sequence, $c(n) = \{c(1) \, c(2) \ldots ; c(k) = 0,1, k=1 \ldots \infty\}$ as generated by the linear feedback register of length L. Here, all generated sequences are assumed to be infinite in duration. It will suffice that the generated sequences are longer than snapshots $r_1 \ldots r_M$ captured by remote terminals $110_1 \ldots 110_n$. The spreading sequence is then modulo-2 added to the data sequence $d(m) = \{d(1) \, d(2) \ldots ; d(i) = 0,1, i=1 \ldots \infty\}$ to generate the spread signal, $s(n) = \{s(1) \, s(2) \ldots ; s(k) = 0,1, k=1 \ldots \infty\}$. The sequence $c(n)$ is determined by the tap weights, $w = \{w_1, w_2, \ldots, w_L; w_i = 0,1\}$. The data, $d(m)$, is clocked at the appropriate bit rate, while the shift register (and resulting spread signal) is clocked at the chip rate.

For purposes of the present invention, it is assumed that K is an integer and the chip transitions are in phase with the bit transitions, that is, the bits and chips are lined up such that an integer number of chips fall exactly in a bit period.

The spread spectrum signal may be modulated onto a carrier with frequency fc, chip pulse shape $h_c(t)$ and chip period $T_c$, to yield unregistered signal 125. Thus, unregistered signal 125 as transmitted may be expressed as:

$$s(t)=\Sigma s(n)\cdot h_c(t-n\cdot T)\cdot\sqrt{E_c}\cdot\cos(2\pi f_c\cdot t+0),$$

where θ is the phase of the carrier, and $E_c$ is the energy per chip.

Unregistered signal 125 as received by each remote terminal $110_1 \ldots 110_n$ may be expressed as received signals $rs_1 \ldots rs_M$, where:

$$rs_1(t)=s(t+\phi_1)+\text{noise}_1(t) t_{start} \leq t < t_{stop},$$

$$rs_2(t)=s(t+\phi_2)+\text{noise}_2(t) t_{start} \leq t < t_{stop},$$

$$rs_M(t)=s(t+\phi_M)+\text{noise}_M(t)\ t_{start} \leq t < t_{stop},$$

$$\ldots$$

where $\text{noise}_1(t)$ and $\text{noise}_2(t)$ are independent AWGN processes with $\sigma_1^2=N_{0_1}/2$ and $\sigma_2^2=N_{0_2}/2$, and $\phi_1-\phi_i$ is the differential phase time between the first and $i^{th}$ receivers.

Assuming ideal carrier and phase recovery, followed by a matched filter detector, snapshots $r_1 \ldots r_M$ captured by the receivers of terminals terminal $110_1 \ldots 110_n$ may be expressed as:

$$r_1(n) = +1 \quad r'_1(t_{start} + nT) \geq 0 \ n = 1 \ldots N$$
$$\phantom{r_1(n) =} -1 \quad r'_1(t_{start} + nT) < 0$$
$$r_2(n) = +1 \quad r'_2(t_{start} + nT) \geq 0 \ n = 1 \ldots N$$
$$\phantom{r_2(n) =} -1 \quad r'_2(t_{start} + nT) < 0$$
$$\ldots$$
$$r_n(n) = +1 \quad r'_M(t_{start} + nT) \geq 0 \ n = 1 \ldots N$$
$$\phantom{r_n(n) =} -1 \quad r'_M(t_{start} + nT) < 0$$

where $r_i'(n)$ are optimal samples of the received signals. Note that received snapshots $r_1 \ldots r_M$ are limited in duration, and the values equal ±1 rather than 0 and 1.

Sequence identification may be possible using snapshots $r_1 \ldots r_M$ from a single remote terminal, for example, remote terminal $110_1$, however, if the signal to noise ratio for unregistered signal 125 is low, snapshots $r_1 \ldots r_M$ from two or more remote terminals $110_1 \ldots 110_n$ may increase correlation values and decrease sequence identification time. Each remote terminal $110_1 \ldots 110_n$ may also be able to perform carrier and phase recovery from unregistered signal 125, as well as maximum likelihood detection, using, for example, a matched filter receiver. There may be signal to noise requirements for detection, for example, the spread signal-to-noise ratio, $E_c/N_0$ may have to be greater than −6 dB for detection.

Snapshots $r_1 \ldots r_M$ from the one or more remote terminals $110_1 \ldots 110_n$ may be synchronous, and may be constrained to a relative delay, for example, no greater than 10 chips. The one or more remote terminals $110_1 \ldots 110_n$ may include GPS information, or other timing references, along with the snapshots. Each snapshot $r_1 \ldots r_M$ may include signal data captured over a particular time period, for example, 100 ms.

Once captured, snapshots $r_1 \ldots r_M$ may be forwarded to local terminal 115 at a rate equal to a fraction of the chip rate, for example 1/100 of the chip rate (determined by the available bandwidth). Forwarding the snapshots will require time much greater than the snapshot duration. For example, it would require approximately 10 seconds to transfer each snapshot $r_1 \ldots r_M$ to local terminal 115, assuming a snapshot length of 100 ms, and a forward transmission rate of 1/100 of the chip rate.

Local terminal 115 may operate to correlate snapshots $r_1 \ldots r_M$ to remove any relative delay between them. The effectiveness of correlation for aligning snapshots $r_1 \ldots r_M$ may be evaluated under low signal-to-noise ratio conditions. If the relative delay cannot be effectively removed, snapshots $r_1 \ldots r_M$ may be processed in parallel and the resulting metrics may be used in tandem.

The time-aligned snapshots $r_1 \ldots r_M$ may then be used to generate a confidence vector v. Confidence vector v is generally used to improve the confidence in a set of correlation coefficients of an estimated spreading sequence. Confidence vector v may also be used to reduce the emphasis on non-matching chips between snapshots $r_1 \ldots r_M$. For example, consider two exemplary received snapshots, $r_1$ and $r_2$:

$$r_1 = [0\ 0\ 1\ \boxed{0}\ 0\ 0\ 0\ 1\ 0\ 0\ 0\ \boxed{1}\ \boxed{0}\ 1\ 0\ 0\ \ldots]$$
$$r_2 = [0\ 0\ 1\ \boxed{1}\ 0\ 0\ 0\ 1\ 0\ 0\ 0\ \boxed{0}\ \boxed{1}\ 1\ 0\ 0\ \ldots]$$

As shown, there are 3 disagreements between snapshots $r_1$ and $r_2$, indicated by the boxed values. Confidence vector, v, can be generated by first converting the snapshots to analog equivalents, $ra_1'$ and $ra_2'$, normalized to values of ±1, then adding the analog equivalents, such that $v=ra_1'+ra_2'$:

$$ra_1' = [-1\ -1\ 1\ \boxed{-1}\ -1\ -1\ -1\ 1\ -1\ -1\ -1\ \boxed{1}\ \boxed{-1}\ 1\ -1\ -1\ \ldots]$$
$$ra_2' = [-1\ -1\ 1\ \boxed{1}\ -1\ -1\ -1\ 1\ -1\ -1\ -1\ \boxed{-1}\ \boxed{1}\ 1\ -1\ -1\ \ldots]$$
$$v = [-2\ -2\ 2\ \boxed{0}\ -2\ -2\ -2\ 2\ -2\ -2\ -2\ \boxed{0}\ \boxed{0}\ 2\ -2\ -2\ \ldots]$$

The entries in confidence vector v, corresponding to the disagreeing chips, are zero in this case. As a result, when confidence vector v is correlated with an estimate of the spreading sequence, these entries will not contribute to the correlation coefficient.

An estimated spreading sequence, $c'(n)$, may be generated by seeding linear feedback register 135, having variable tap weights, with a portion of received snapshots $r_1 \ldots r_M$, and then clocking linear feedback register 135 to generate the estimate. The length L' of linear feedback register 135, is assumed to be greater than the length L of linear feedback register 310 used to generate unregistered signal 125.

Figure 4:
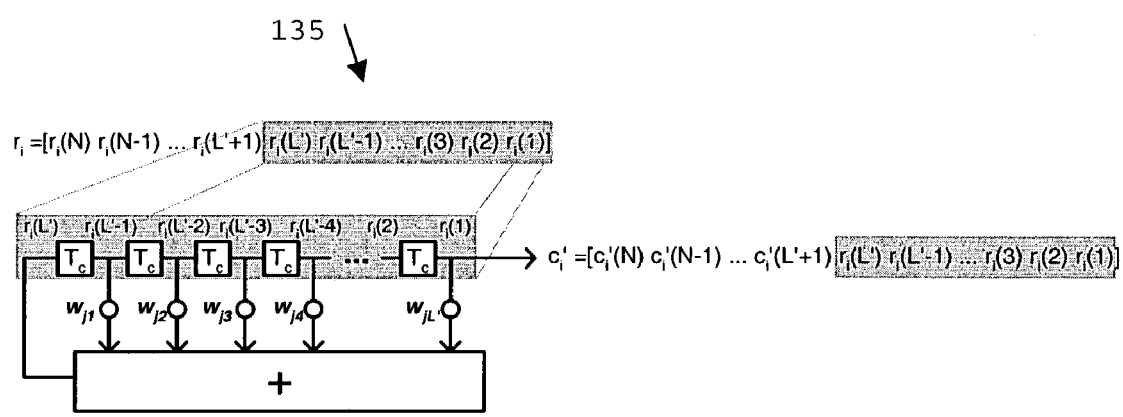
FIG. 4 shows a diagram of a linear feedback register for generating spreading sequence estimates for determining an unknown spreading sequence of a signal.

As shown in FIG. 4, the linear feedback register tap weights are chosen to represent the coefficients of various candidate spreading sequence generator polynomials up to the maximal spreading sequence length for linear feedback register 135 having length L'.

As FIG. 4 illustrates, the generated sequence $c_i'$ will include the first L' elements of a snapshot $r_1 \ldots r_M$, followed by estimates of the remaining spreading sequence. The first L' elements of snapshot $r_1 \ldots r_M$ may be equal to the corresponding elements of the spreading sequence (or the negative of the spreading sequence). It may be possible to leverage information from the confidence vector v to identify likely errors in the first L' samples of snapshot $r_1 \ldots r_M$. These samples may be systematically adjusted if necessary.

Figure 5:
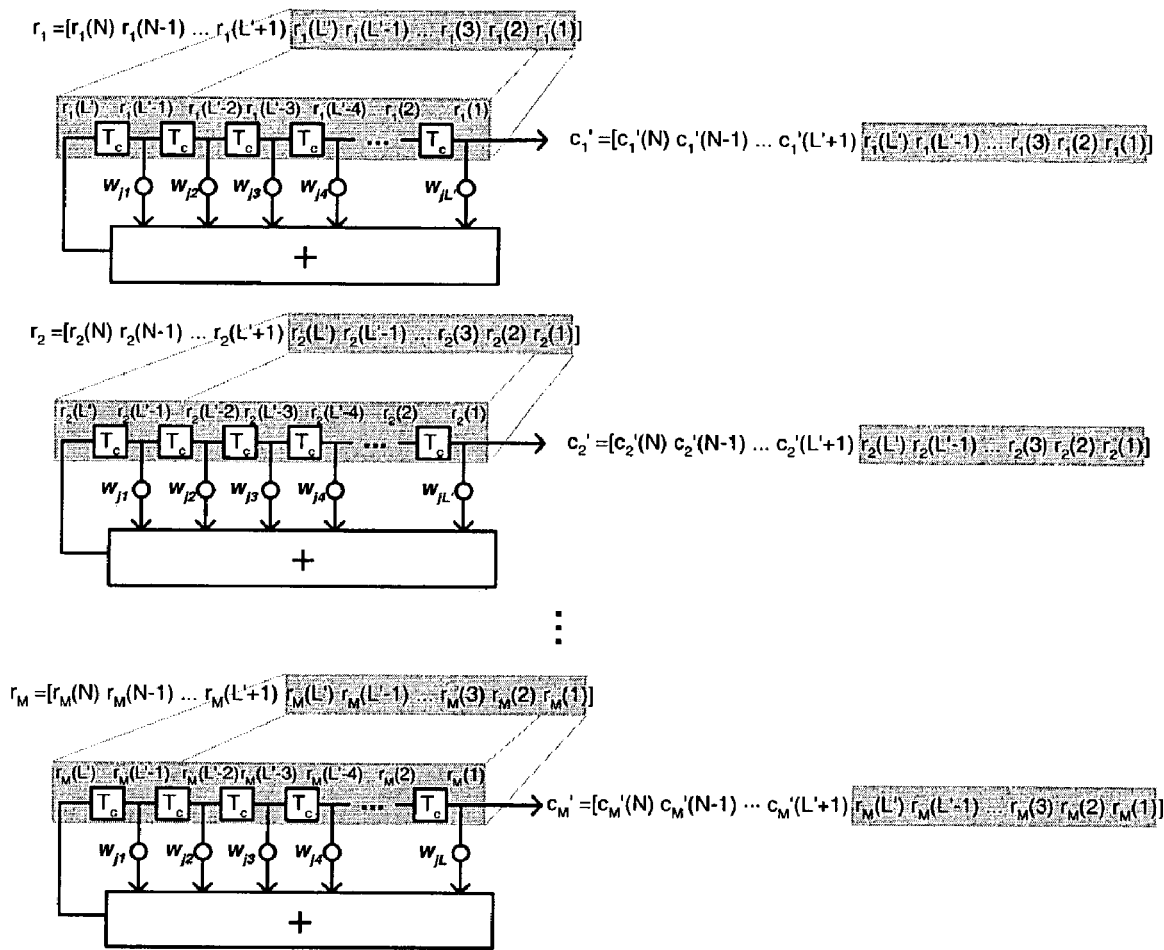
FIG. 5 shows a diagram of a linear feedback register for generating spreading sequence estimates for a series of snapshots of a signal.

As shown in FIG. 5, this process may be repeated for all M received snapshots, $r_1(n) \ldots r_M(n)$, making use of all available information For a small number, n, of remote terminals $110_1 \ldots 110_n$, the estimates may be generated in parallel. As the number of remote terminals $110_1 \ldots 110_n$ increases, the estimate generation may occur sequentially.

A set of estimates is generated for each of the J candidate spreading sequences, using the corresponding linear feedback register tap weights, $w_j = [w_{j1}\ w_{j2}\ w_{j3} \ldots w_{jL}']$, $j=1 \ldots J$. The different tap weight vectors can be evaluated in parallel. Alternately, the evaluation may be performed sequentially.

Once estimates of the spreading sequence have been generated using linear feedback register 135, the estimates may be correlated with the confidence vector v to determine the quality of the estimates. The sequence generator polynomial that consistently provides the best estimates of the spreading sequence may then be chosen as the likely spreading sequence.

The correlation process includes an element-by-element multiplication of each sequence estimate $c_i'$ with confidence vector, v, followed by a summation of the resulting vector elements. The result is a correlation coefficient, $\gamma_{ij}$, $i=1 \ldots M$, $j=1 \ldots J$, for each sequence estimate and candidate sequence polynomial An overall correlation coefficient for each polynomial, $\gamma_j = \Sigma \gamma_{i,j}$, $i=1 \ldots M$, $j=1 \ldots J$, provides the basis for selecting the most likely polynomial.

While it may be possible to correlate each sequence estimation vector, $c_i$, with the corresponding snapshot, $r_i$, this approach would likely require considerable time to identify the proper spreading sequence, at least because more snapshots may be required to average out the effect of the high error rates associated with the snapshots. Confidence vector v combines the information contained in the M snapshots to minimize the contribution of likely errors and to maximize the contribution of likely correct samples during the correlation process.

As mentioned above, in order to isolate the spreading sequence from the data sequence contained within each snapshot, the data transitions must be identified. Identifying the data sequence may be performed in the middle of the correlation process by analyzing the result of the element-by-element multiplication. If the spreading rate, K, is known, sequences of K positive or negative values may be found, indicating data ones and zeros respectively. The exact polarity of the data may not be known until the signal has been decrypted and decoded. The process described herein results in a despreading sequence that will produce either an estimate of the data sequence, or an estimate of the inverse of the data sequence. Additional processing may be required to recover the proper polarity. An early-late-gate architecture, such as those employed in many clock recovery circuits, is one possible approach to identifying the data transitions. Such an approach may also work if the spreading rate is not exactly known.

It is important to note that the underlying data sequence must be taken to account within the snapshot data. There are at least two situations that should be considered. First, a data transition can occur in the underlying data somewhere in the first L' samples of the snapshot. In such a case, the latter bits in linear feedback register 135 will be inverted relative to the rest, possibly resulting in an indistinguishable spread sequence. Second, the data transitions in the remaining snapshot must be accounted for when correlating the snapshot with the estimated spreading sequence.

To address these situations, it may be assumed that the spreading factors are quite large, on the order of 100 or greater. As a result, there are many chips for each data bit. Provided that the length of linear feedback register 135 is significantly less than the spreading factor, it will be unlikely that a data transition will occur when seeding linear feedback register 135. If, however, it is found that transitions do occur regularly within linear feedback register 135, the various snapshots can be taken at random times and the number of iterations can be increased to average out this effect.

Properly treating data transitions in the correlation process requires estimates of the data transitions. Various techniques are available, including an early-late-gate type architecture operating on the correlated sequences. Once data transitions have been identified, simple majority rules logic can be performed to adjust the sign of the proper bits during the correlation process. Depending on the quality of the transition time estimates, the confidence vector can be adjusted appropriately, for example by reducing the confidence vector values surrounding the estimated transition time.

The present invention is advantageous in that it provides for detection of a spread spectrum signal with unknown characteristics, identification of the spreading sequence of the detected signal, and a despreading facility to extract the signal's data sequence.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for despreading a spread spectrum signal comprising:
    acquiring a plurality of snapshots of the signal;
    constructing a confidence vector from at least two of the plurality of snapshots;
    generating a first estimated spreading sequence of the signal; and
    correlating the first estimated spreading sequence and the confidence vector to generate a second spreading sequence for despreading the signal,
    wherein the confidence vector is constructed by normalizing at least two of the plurality of snapshots and adding the at least two normalized snapshots.

2. The method of claim 1, wherein the estimated spreading sequence is generated by seeding a linear feed back register with a portion of at least one of the plurality of snapshots.

3. The method of claim 1, wherein correlating the first estimated spreading sequence and the confidence vector yields correlation coefficients used for generating the second spreading sequence.

4. A system for despreading a spread spectrum signal comprising:
   at least one receiver for capturing a plurality of snapshots of the signal; and
   a processing device for constructing a confidence vector from at least two of the plurality of snapshots, wherein the processing device is operable to generate a first estimated spreading sequence of the signal, and to correlate the first estimated spreading sequence and the confidence vector to generate a second spreading sequence for despreading the signal,
   wherein the processing device is operable to construct the confidence vector by normalizing at least two of the plurality of snapshots and adding the at least two normalized snapshots.

5. The system of claim 4, wherein the processing device further comprises a linear feedback register wherein the first estimated spreading sequence is generated by seeding the linear feedback register with a portion of at least one of the plurality of snapshots.

6. The system of claim 4, wherein the processing device is operable to correlate the first estimated spreading sequence and the confidence vector to yield correlation coefficients used for generating the second spreading sequence.

7. A remote terminal for despreading a spread spectrum signal comprising:
   circuitry for capturing a plurality of snapshots of the signal; and
   a link to a local terminal having a facility to construct a confidence vector from at least two of the plurality of snapshots, wherein the local terminal is operable to generate a first estimated spreading sequence of the signal, and to correlate the first estimated spreading sequence and the confidence vector to generate a second spreading sequence for despreading the signal,
   wherein the local terminal is operable to construct the confidence vector by normalizing at least two of the plurality of snapshots and adding the at least two normalized snapshots.

8. The remote terminal of claim 7, wherein the local terminal further comprises a linear feedback register wherein the first estimated spreading sequence is generated by seeding the linear feedback register with a portion of at least one of the plurality of snapshots.

9. The remote terminal of claim 7, wherein the local terminal is operable to correlate the first estimated spreading sequence and the confidence vector to yield correlation coefficients used for generating the second spreading sequence.

10. A local terminal for despreading a spread spectrum signal comprising:
    a link to a remote terminal for capturing a plurality of snapshots of the signal; and
    a processing device for constructing a confidence vector from at least two of the plurality of snapshots, wherein the processing device is operable to generate a first estimated spreading sequence of the signal, and to correlate the first estimated spreading sequence and the confidence vector to generate a second spreading sequence for despreading the signal,
    wherein the processing device is operable to construct the confidence vector by normalizing at least two of the plurality of snapshots and adding the at least two normalized snapshots.

11. The local terminal of system of claim 10, further comprising a linear feedback register wherein the first estimated spreading sequence is generated by seeding the linear feedback register with a portion of at least one of the plurality of snapshots.

12. The local terminal of system of claim 10, wherein the processing device is operable to correlate the first estimated spreading sequence and the confidence vector to yield correlation coefficients used for generating the second spreading sequence.

13. A method for despreading a spread spectrum signal comprising:
    detecting a spread spectrum signal;
    comparing characteristics of the detected signal to a set of known signal characteristics;
    despreading the detected signal if the detected signal characteristics match the set of known signal characteristics;
    acquiring a plurality of snapshots of the detected signal if the detected signal characteristics do not match the set of known signal characteristics;
    constructing a confidence vector from at least two of the plurality of snapshots;
    generating a first estimated spreading sequence of the detected signal; and
    correlating the first estimated spreading sequence and the confidence vector to generate a second spreading sequence for despreading the detected signal,
    wherein the confidence vector is constructed by normalizing at least two of the plurality of snapshots and adding the at least two normalized snapshots.

14. The method of claim 13, wherein the estimated spreading sequence is generated by seeding a linear feedback register with a portion of at least one of the plurality of snapshots.

15. The method of claim 13, wherein correlating the first estimated spreading sequence and the confidence vector yields correlation coefficients used for generating the second spreading sequence.

* * * * *